C. McC. SUSSMAN.

SHIRT CUFF.

APPLICATION FILED JAN. 9, 1919.

Reissued Feb. 11, 1919. 14,591.

Cornelia McCue Sussman
INVENTOR

BY Geo. W. Tucker
ATTORNEY

THE NORRIS PETERS CO., PHOTO-LITHO., WASHINGTON, D. C.

UNITED STATES PATENT OFFICE.

CORNELIA McCUE SUSSMAN, OF LONG BRANCH, NEW JERSEY.

SHIRT-CUFF.

14,591. Specification of Reissued Letters Patent. Reissued Feb. 11, 1919.

Original No. 1,239,137, dated September 4, 1917, Serial No. 156,405, filed March 21, 1917. Application for reissue filed January 9, 1919. Serial No. 270,422.

*To all whom it may concern:*

Be it known that I, CORNELIA McCUE SUSSMAN, a citizen of the United States, and a resident of Long Branch, in the county of Monmouth and State of New Jersey, have invented a certain new and useful Improvement in Shirt-Cuffs, of which the following is a full, clear, and exact specification.

This invention relates more particularly to articles used in conjunction with a class of wearing apparel.

My invention has for its object primarily to provide a cuff commonly known as the soft turnover style used on certain forms of men's shirts, and which is designed so that the wearing quality of the cuff will be greatly increased by employing a flexible member, or strip on the cuff so that when folded the strip will serve as a wearing surface to protect the underneath layers of the body of the cuff. The protecting strip is preferably made of the same material as the cuff proper for being practically unnoticeable, and the strip is applied to the cuff so that when damaged by wear the strip may be removed. The body of the cuff will thereby be kept in practically perfect condition, and as the folded edges of cuffs of this class usually wear out before other parts of the garment the requirement for replacing the cuffs will be largely overcome as well as preventing the shirt from being prematurely dispensed with.

A further object of the invention is to provide means whereby the edges of the strip are attached to the body of the cuff to allow the strip to be readily removed therefrom.

A practical embodiment of the invention is represented in the accompanying drawing forming a part of this specification in which similar characters of reference indicate corresponding parts in all the views, and will then be pointed out in the claims at the end of the description.

In the drawing, Figure 1 is a fragmentary view showing an elevation of one form of shirt cuff embodying my invention when folded.

Figure 1:
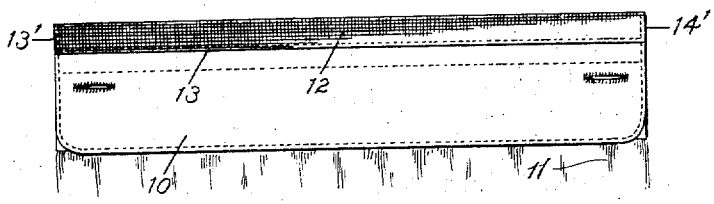
Figure 2:
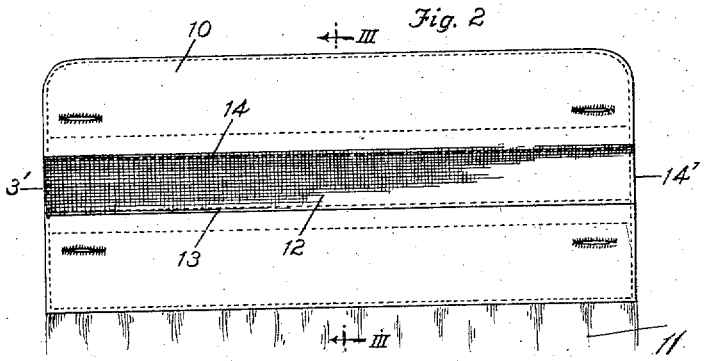
Fig. 2 is an inverted plan of the cuff when unfolded.
Figure 3:
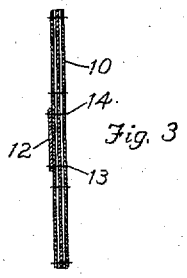
Fig. 3 is a section taken on the line III—III of Fig. 2.

The cuff has a body 10 which may be fashioned in the usual, or any preferred form for use on the end of the sleeve, as 11, of a shirt, and as is incident to garments of this class the cuff is ordinarily made of the same cloth or material as the shirt proper. This cuff is also preferably of the well-known soft turn-over style with one of its lengthwise edges being stitched to the sleeve of the shirt, and the central part of its body 10 is creased to allow the second free end half of the body to be folded in overlapping arrangement on the stitched half of the body.

The wearing surface of shirt cuffs of this type is therefore imposed principally upon the body 10 at its lengthwise crease, and serving to prevent this part of the body from becoming prematurely worn, a removable protecting flexible member, or strip, as 12, is provided. The protecting strip 12 is preferably made of like material as well as being of a similar pattern to the body of the cuff, and this strip may be of a desired width, while being of a length corresponding to the length of the body of the cuff. The protecting strip is disposed on the inner surface of the body of the cuff so that its central part lengthwise will be superimposed on the part of the body corresponding to the line on which it may be creased when the cuff is folded and so that the strip will cover parts of the body adjacent to the creasing line. The strip is then removably attached to the body of the cuff by both of the lengthwise edges of the strip being stitched, at 13 and 14, and also at the end edges by being stitched, at 13′ and 14′ in like manner, to the body; and this stitching is preferably, but not necessarily, done according to a common method known as chain-stitching which by pulling the thread of each of the stitched edges of the strip will cause all of the thread to be ripped to allow the strip to be easily removed from the body 10 of the cuff; but I do not intend to limit myself to such chain-stitching, as any stitching easily cut or ripped is within the scope of my invention as is also a cuff so formed removable from the sleeve in the well known manner instead of a cuff permanently attached thereto, as shown in the drawing.

The protecting strip thus applied to the cuff is creased simultaneously with the creasing of the body 10 when the free end half of the body is folded over upon the other half of the body. The protecting strip will then be on the wearing edge of the cuff to prevent the body from prematurely becoming worn, and when the strip is frayed or otherwise damaged it is removed in the manner above described, in order to preserve the durability of the cuff proper of the shirt as well as overcoming the necessity for its replacement with a new cuff.

In the foregoing description, I have embodied the preferred form of my invention but I do not wish to be understood as limiting myself thereto, as I am aware that modifications may be made therein without departing from the principle, or sacrificing any of the advantages of this invention, therefore I reserve to myself the right to make such changes as fairly fall within the scope thereof; such for instance as applying the invention herein disclosed, described and claimed, to other than so-called soft goods, such as to normally hard and stiff goods, or to goods adapted to be stiffened by starching, etc.

Having thus described my invention, I claim as new and desire to secure by Letters Patent:—

1. A shirt cuff, comprising a body adapted to be folded so that one of its halves overlaps the other half, and a strip of the same material and of the same pattern as the body arranged thereon so that when folded the strip will provide a wearing surface, and the strip being stitched to the body so as to be removable therefrom.

2. A shirt cuff, comprising a body adapted to be folded so that one of its halves overlaps the other half, and a strip of the same material and of the same pattern as the body arranged thereon so that when folded the strip will provide a wearing surface, and the strip being chain-stitched to the body so as to be removable therefrom.

3. A shirt-cuff comprising a body adapted to be folded longitudinally on or adjacent to and along its central line of greatest length, and a strip of the same material as the body superposed thereon along the line upon which the cuff is to be folded extending on either side beyond the line of fold, which strip is secured to the body by line of stitches along and adjacent to the edges of such strip.

4. A shirt-cuff comprising a body adapted to be folded longitudinally on or adjacent to and along its central line of greatest length, and a strip of the same material as the body superposed thereon along the line upon which the cuff is to be folded extending on either side beyond the line of fold, which strip is secured to the body by lines of stitches along and adjacent to the edges and ends of such strip.

Signed, at the borough of Manhattan, county, city and State of New York, this 19th day of December, 1918.

CORNELIA McCUE SUSSMAN.

Witnesses:
CLARENCE LADD-DAVIS,
BLANCHE U. BRONSON.

Copies of this patent may be obtained for five cents each, by addressing the "Commissioner of Patents, Washington, D. C."